(12) United States Patent
Reichle

(10) Patent No.: US 7,147,519 B2
(45) Date of Patent: Dec. 12, 2006

(54) HYBRID PLUG CONNECTOR

(75) Inventor: Martin Reichle, Wetzikon (CH)

(73) Assignee: Reichle & De-Massari AG, Wetzikon (CH)

( * ) Notice: Subject to any disclaimer, the term of this patent is extended or adjusted under 35 U.S.C. 154(b) by 0 days.

(21) Appl. No.: 10/512,949

(22) PCT Filed: May 2, 2003

(86) PCT No.: PCT/CH03/00286

§ 371 (c)(1),
(2), (4) Date: Feb. 14, 2005

(87) PCT Pub. No.: WO03/093888

PCT Pub. Date: Nov. 13, 2003

(65) Prior Publication Data

US 2005/0118880 A1    Jun. 2, 2005

(30) Foreign Application Priority Data

May 2, 2002 (CH) .................................... 0748/02
Mar. 12, 2003 (CH) .................................... 0395/03

(51) Int. Cl.
*H01R 24/00* (2006.01)
(52) U.S. Cl. ...................................... 439/676; 439/638

(58) Field of Classification Search ................ 439/676, 439/638–639, 540.1
See application file for complete search history.

(56) References Cited

U.S. PATENT DOCUMENTS

| | | | | |
|---|---|---|---|---|
| 4,362,905 A * | 12/1982 | Ismail | ........................ | 379/442 |
| 4,494,815 A * | 1/1985 | Brzostek et al. | ............. | 439/536 |
| 4,714,440 A * | 12/1987 | Hutchins | ..................... | 439/676 |
| 4,834,661 A * | 5/1989 | McMillian | ................... | 439/512 |
| 6,159,039 A * | 12/2000 | Wu | ........................ | 439/541.5 |
| 6,206,724 B1 * | 3/2001 | Leung | ..................... | 439/540.1 |
| 6,599,025 B1 * | 7/2003 | Deutsch | ...................... | 385/75 |

* cited by examiner

*Primary Examiner*—Michael C. Zarroli
(74) *Attorney, Agent, or Firm*—Nath & Associates PLLC; Jerald L. Meyer; Derek Richmond

(57) ABSTRACT

A hybrid socket (7), with a housing (2), comprises recesses and/or through channels (9). Electrical and/or optical components can be placed in said recesses and/or through channels (9), in particular optical lines (POFs), mini-coax cables, power supply or control cables, light diodes or components for wireless transmission systems. Said recesses and/or through channels (9) are arranged such that said electrical and/or optical components can be simultaneously used with standard RJ-45 plug connectors to give a universal interface.

10 Claims, 17 Drawing Sheets

Figure 1A:
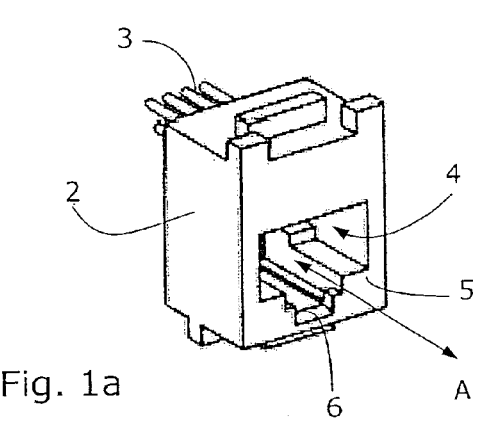
Figure 1B:
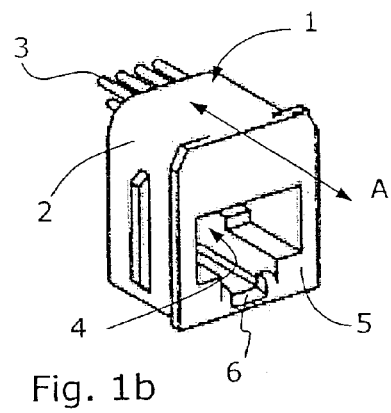
Figure 1C:
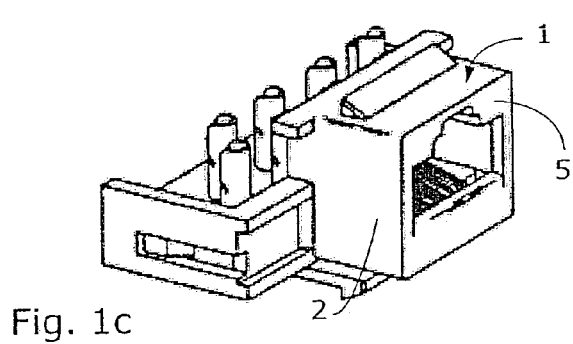
Figure 1D:
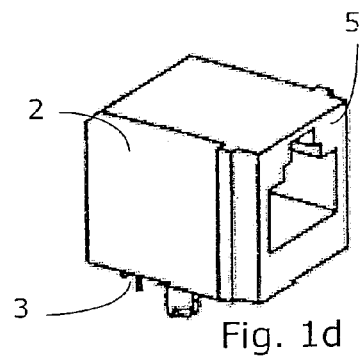
Figure 1E:
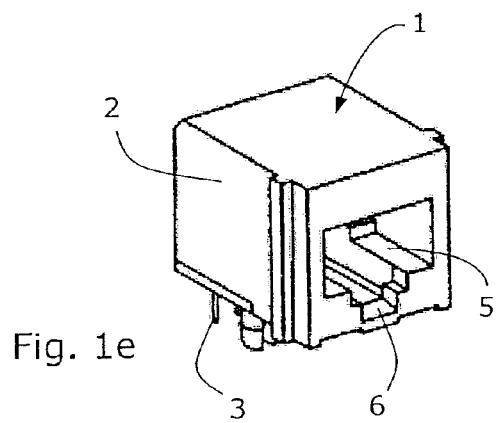
Figure 1F:
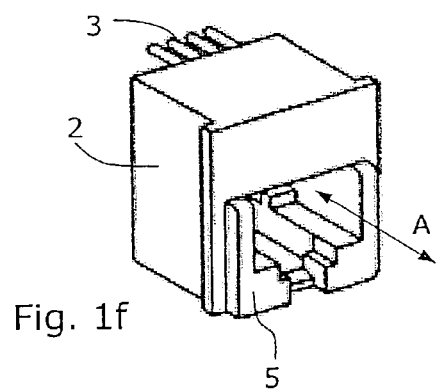
Figure 1G:
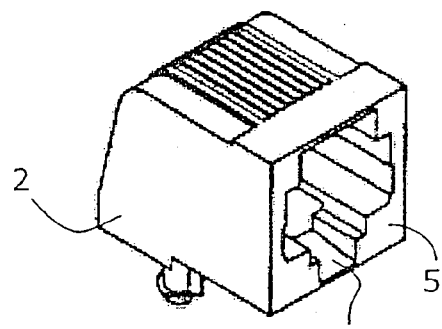
Figure 1H:
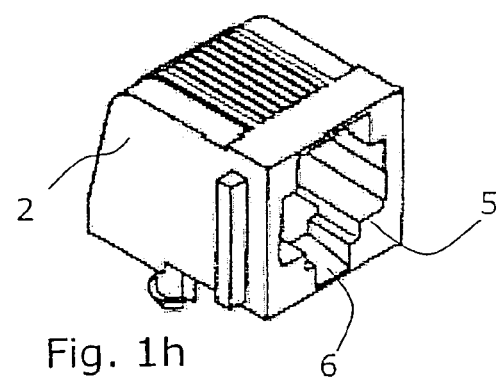
Figure 1I:
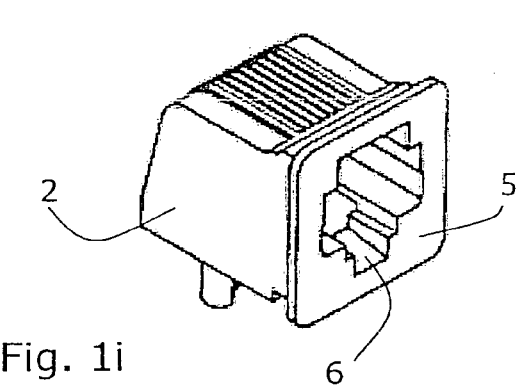
Figure 1J:
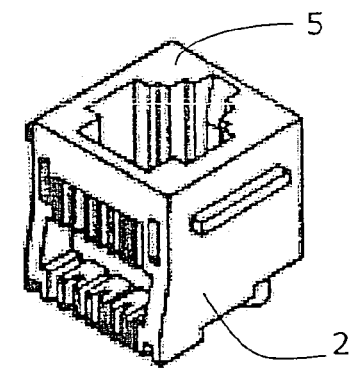

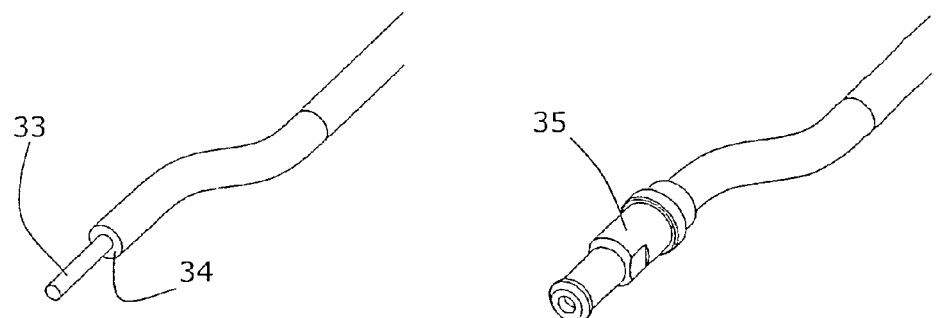
Fig. 10
Fig. 11
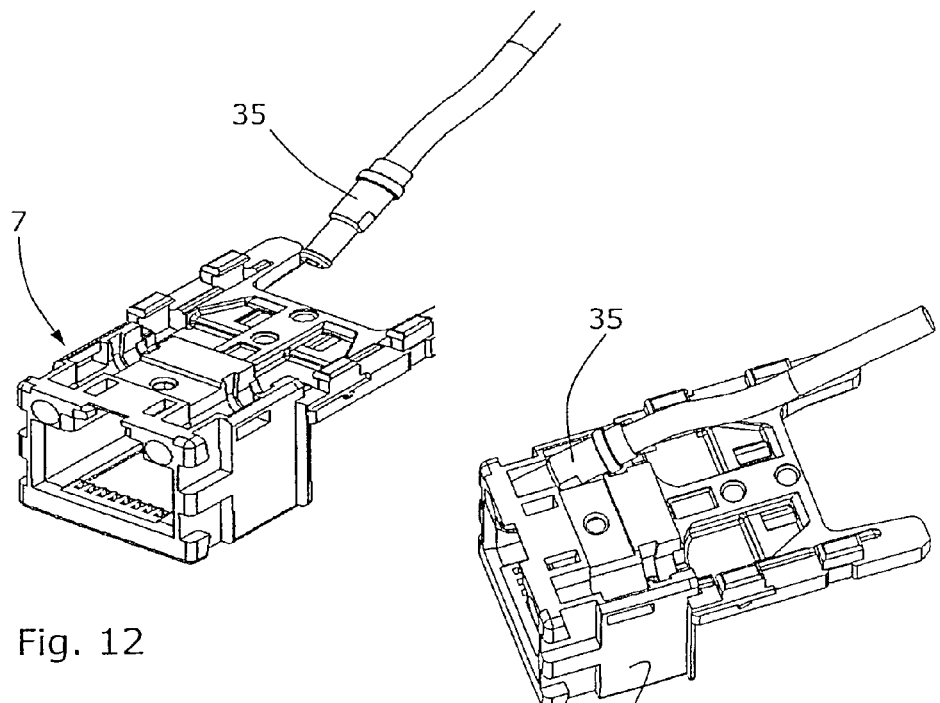
Fig. 12
Fig. 13

Fig. 22
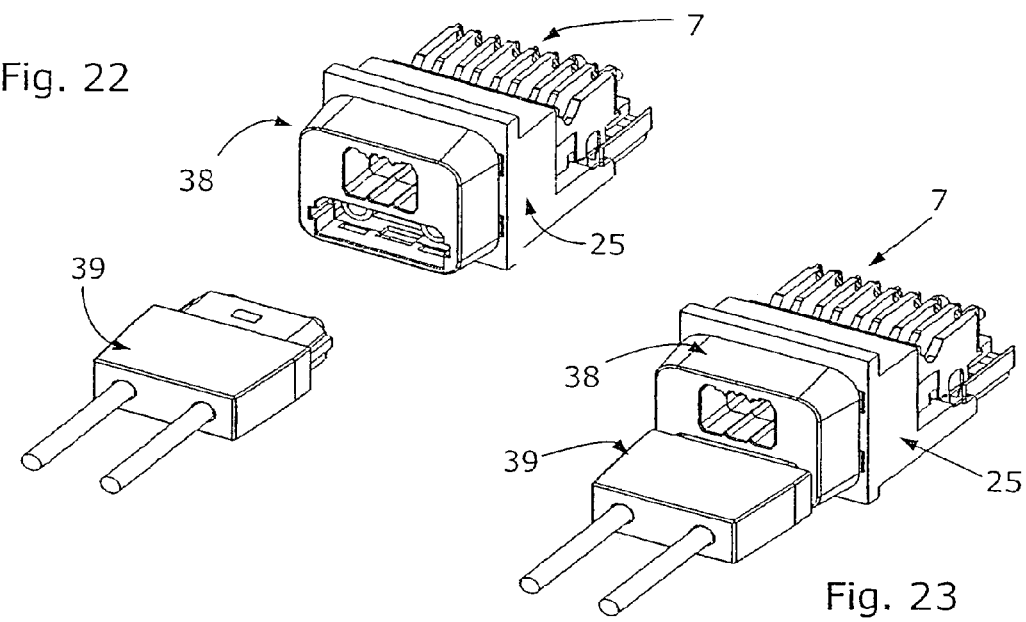
Fig. 23
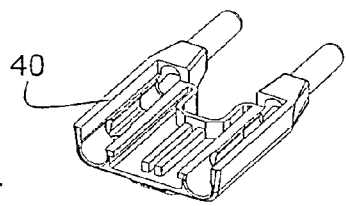
Fig. 24
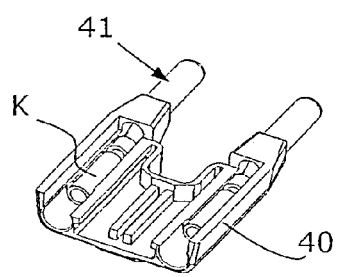
Fig. 25
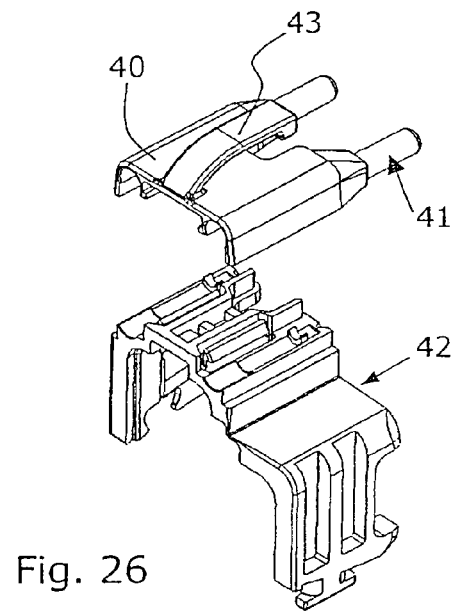
Fig. 26

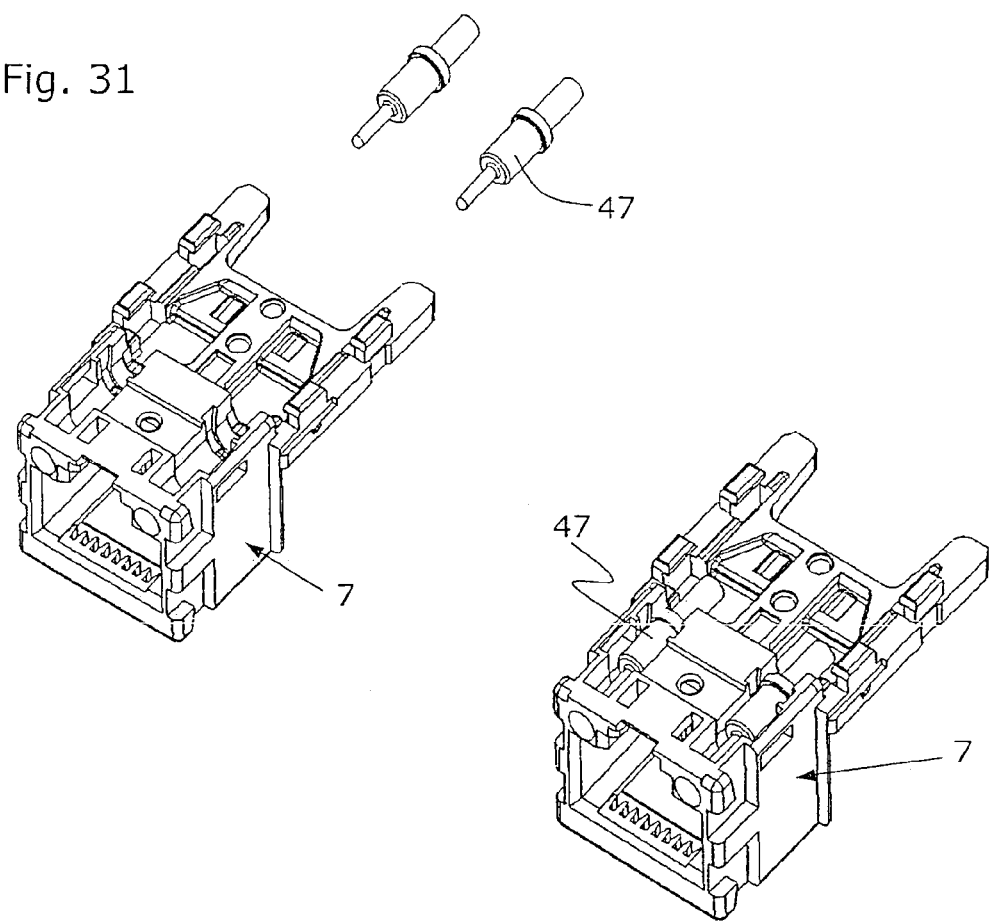
Fig. 31
Fig. 32
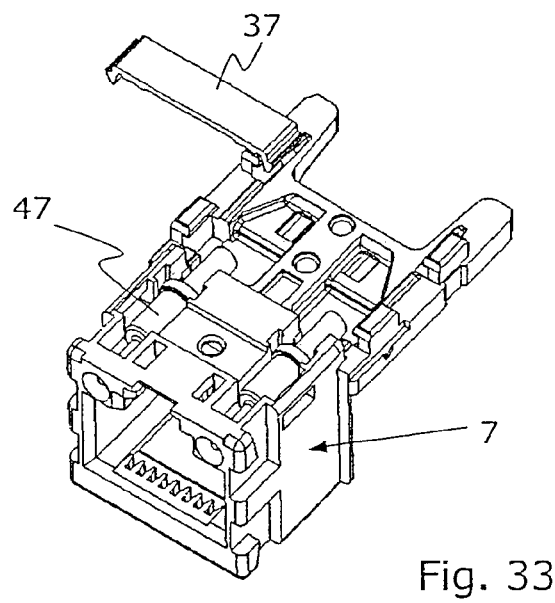
Fig. 33

HYBRID PLUG CONNECTOR

The present invention relates to a hybrid socket according to the preamble of claim 1, a hybrid plug that fits said socket according to the preamble of claim 6, an auxiliary plug according to the preamble of claim 9, and an adapter frame according to the preamble of claim 10.

Plug connector systems are used, e.g., in computer technology, in telecommunications, and in image and sound transmission. The increased use of these technologies in the home and office has lead to different connector systems whose variety is impossible for the non-specialist to adequately survey. Trends are therefore identifiable that seek to combine a number of differently designed communication and data cable or connector systems. Most recently, for example, communication and data cabling were brought together in the so-called "universal building cable system" (UGV). The UGV is being further developed to include other areas of application (e.g., multimedia, building automation, machine control) outside of the office domain (for example, in the area of the home and in industry). This development is supported by the dissemination of the IP transmission protocol and the development of remote feed capabilities in the ethernet domain, in accordance with IEEE 802.3. Another development is evident in the enlargement of data bandwidth, particularly for home use; also evident are developments in plastic optical fibers operating with easily installed cable systems.

For all these reasons, various universal interfaces, or hybrid connector systems, are already known, by means of which different cable types, e.g., copper cables and optical fibers, can be coupled side by side. A hybrid connector system of this kind is described, e.g., in EP 1 102 099. This hybrid connector system makes it possible to couple optical conductors and copper cables simultaneously and independently of each other. To this end, a plug housing is proposed in which both optical fiber cables and cables for the transmission of electrical signals are laid side by side. This hybrid connector system is relatively voluminous and does not permit the use of conventional RJ45 plugs under the ISO/IEC 11801 standard.

A hybrid plug which permits both the use of conventional RJ45 plugs and the production of optical contacts is described in WO 98/18033. Provided in this socket are optically conducting elements to which optical conductors can be coupled by means of an adapter with appropriate dimensions. With this socket it is possible to produce either an electrical connection or an optical connection, though different conductor systems cannot be employed simultaneously. Thus this hybrid socket does not permit the simultaneous use of different, independent plugs.

The plug according to DE-U 201 13 501 is intended to overcome this deficiency. This plug exhibits a socket in which an RJ45 plug and an optical cable pair can be simultaneously inserted. To this end the socket has an additional housing exhibiting reception holes for the introduction of control and power cables. As compared to conventional RJ45 sockets, this hybrid socket has larger outer dimensions and is unsuited for use in existing patch panels or multi-media outlets.

In summary, the known hybrid plug systems all have either a specially designed hybrid plug—i.e., existing, conventional plugs cannot be used in these systems—or they represent individual solutions for existing cable combinations, i.e., do not permit the simultaneous use of plugs that are independent of each other; or they require a hybrid socket with external dimensions which exceed the dimensions of the international standard (IEC 60603-7) and consequently cannot be used in existing patch panels or multimedia outlets.

The goal of the invention, therefore, is to create a universal interface for a hybrid connector system which permits a connection involving electrical cables (e.g., copper cables for telecommunications, signal cables) to be combined with a connection involving other electrical cables (e.g., shielded control and power cables), or with a standardized connection involving optical conductors, specifically by means of standardized plugs for various applications, particularly for RJ45 plugs.

In particular, the goal of the invention is to create a hybrid socket which can be installed in existing patch panels or multi-media sockets, i.e., does not have an external cross-section that exceeds the dimensions of IEC standard 60603-7.

In accordance with the invention, this problem is solved by a universal interface which comprises a hybrid socket exhibiting the features of claim 1, and particularly by a hybrid socket for internationally standardized "small form factor" (SFF) plug systems, as well as RJ45 plugs under IEC 60603-7, a hybrid socket in which there are open spaces, hereinafter called through-channels, or suitably positioned recesses, running through the steps adjacent to a snap-in area. In the following, SFF plug systems are understood to be those sockets defined in IEC standard 60603-7 (1996-11) and the plugs that fit them.

TABLE 1

Small Form Factor (SFF) Sockets

| Variant under IEC standard 60603-7 | height in mm | width in mm |
| --- | --- | --- |
| Type A, variant 01 | $a_1$ = 18.0–18.5 | $c_1$ = 15.6–16.1 |
| Type A, variant 02 | $a_1$ = 17.8–18.3 | $c_1$ = 13.8–13.9 |
| Type A, variant 03 | $a_1$ = 19.3 max | $p_1$ = 14.4–14.6 |
| Type B, variant 01 | $a_1$ = 16.1–16.5 | $c_1$ = 15.5–15.6 |
| Type B, variant 02 | $a_1$ = 15.8–16.2 | $c_1$ = 15.5–15.6 |
| Type B, variant 03 | $a_1$ = 10.8–11.2 | $c_1$ = 15.5–15.6 |
| Type B, variant 04 | $a_1$ = 14.9–15.1 | $c_1$ = 15.1–15.4 |
| Type B, variant 05 | $a_1$ = 14.9–15.1 | $c_1$ = 15.1–15.4 |
| Type B, variant 06 | $a_1$ = 17.2–17.4 | $c_1$ = 15.1–15.4 |
| Type B, variant 07 | $a_1$ = 15.8–16.0 | $x_1$ = 15.4–15.6 |

In an initial embodiment the hybrid socket exhibits a housing with an opening or recess on the plug side to receive a standardized RJ45 plug. The steps lying immediately next to the click-in area of this plug-side recess are provided with through-channels. On the appliance side these through-channels feed into the grooves of a cable guide plate, in which, e.g., an optical conductor can be laid. In this embodiment it is possible to secure a retaining plate to the cable guide plate; this retaining plate both protects the mounted cable and serves to fasten the entire housing in the device to an appliance, outlet, or a patch-panel. On the plug side, the hybrid socket according to the invention can be supplemented with a plug holder, which is secured to the mounting plate, e.g., by means of snap-in elements; the mounting plate is provided with corresponding snap-in holes.

In another embodiment the cable guide plate can be specially equipped for guiding mini-coax cables or feed cables. It is naturally possible to provide the through-channels with suitable coupling elements or cable guide elements.

Preferred elaborations and embodiments of the hybrid socket according to the invention exhibit the features of secondary claims 2–5.

The through-channels according to the invention thus permit the independent reception of an electrical and/or optical component, particularly POFs (plastic optical fibers) in accordance with IEEE 1394, mini-coax cables, power supply or control cables, optical elements (for example, LEDs for monitoring), or components for wireless transmission systems. In particular, the universal interface according to the invention permits the combination of known cabling systems, as used in the multi-media area, in industry, or in the (wireless) office domain.

Moreover, the spacing of the through-channels permits the use of existing optical fiber plug systems under IEEE standard 1394.

Figure 2:
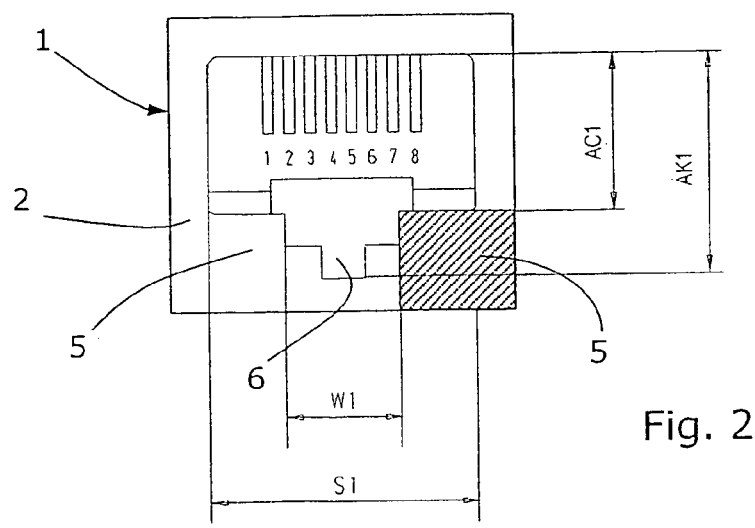
Figure 3:
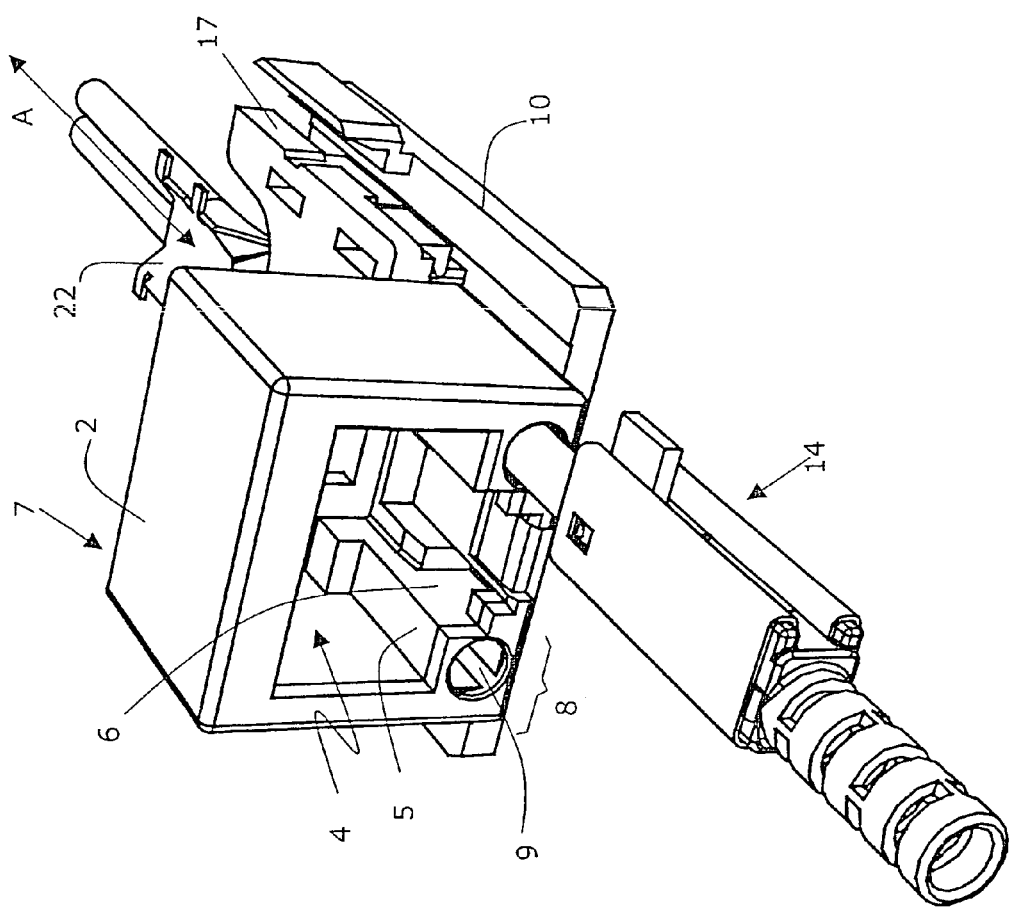
Figure 4:
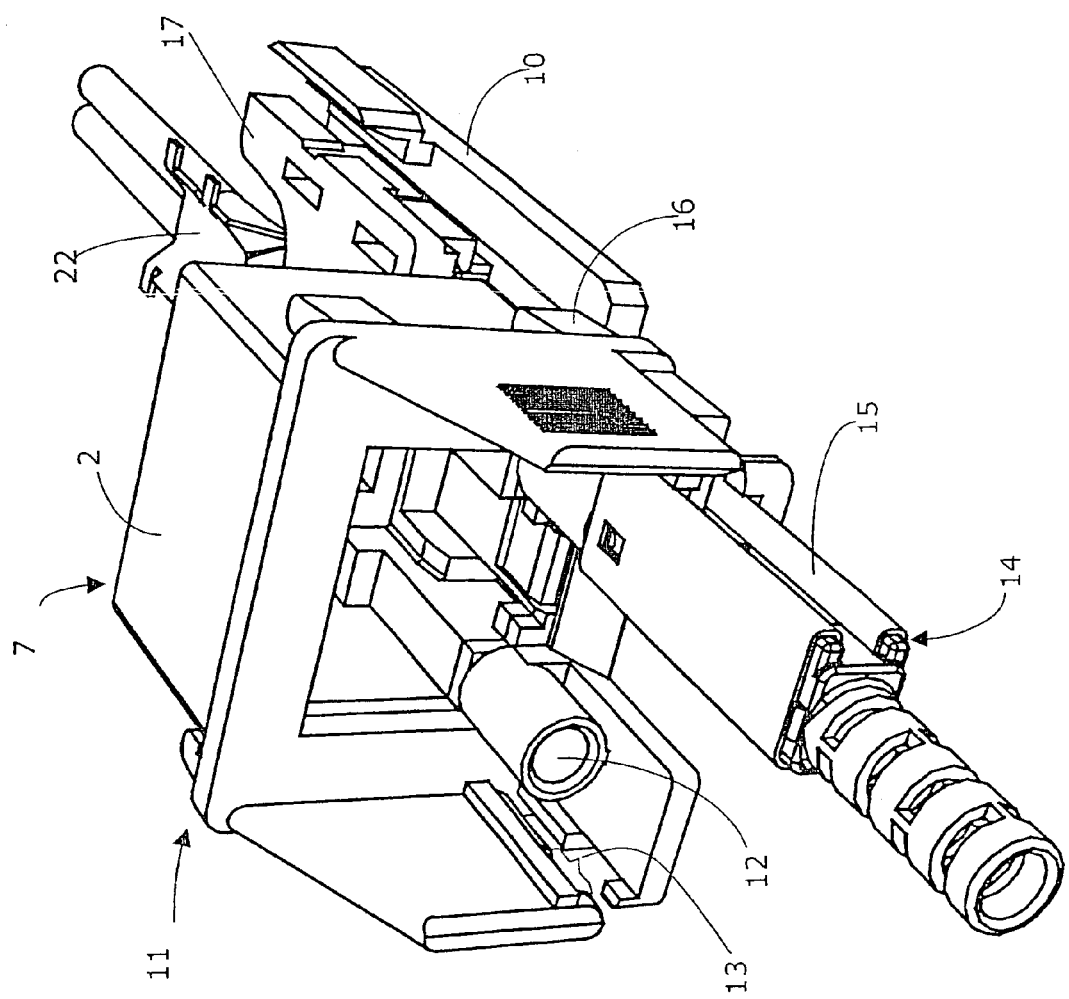
Figure 5:
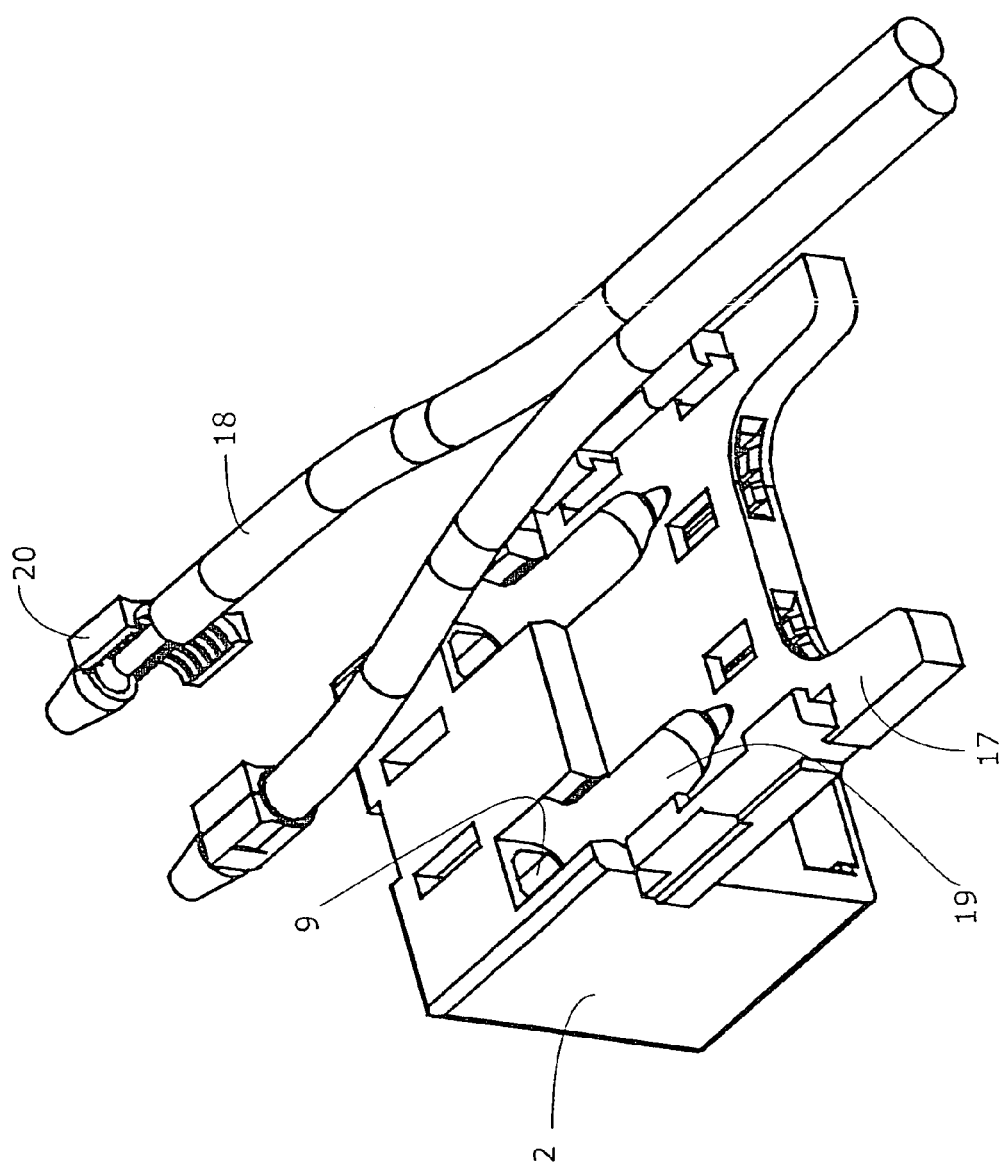
Figure 6:
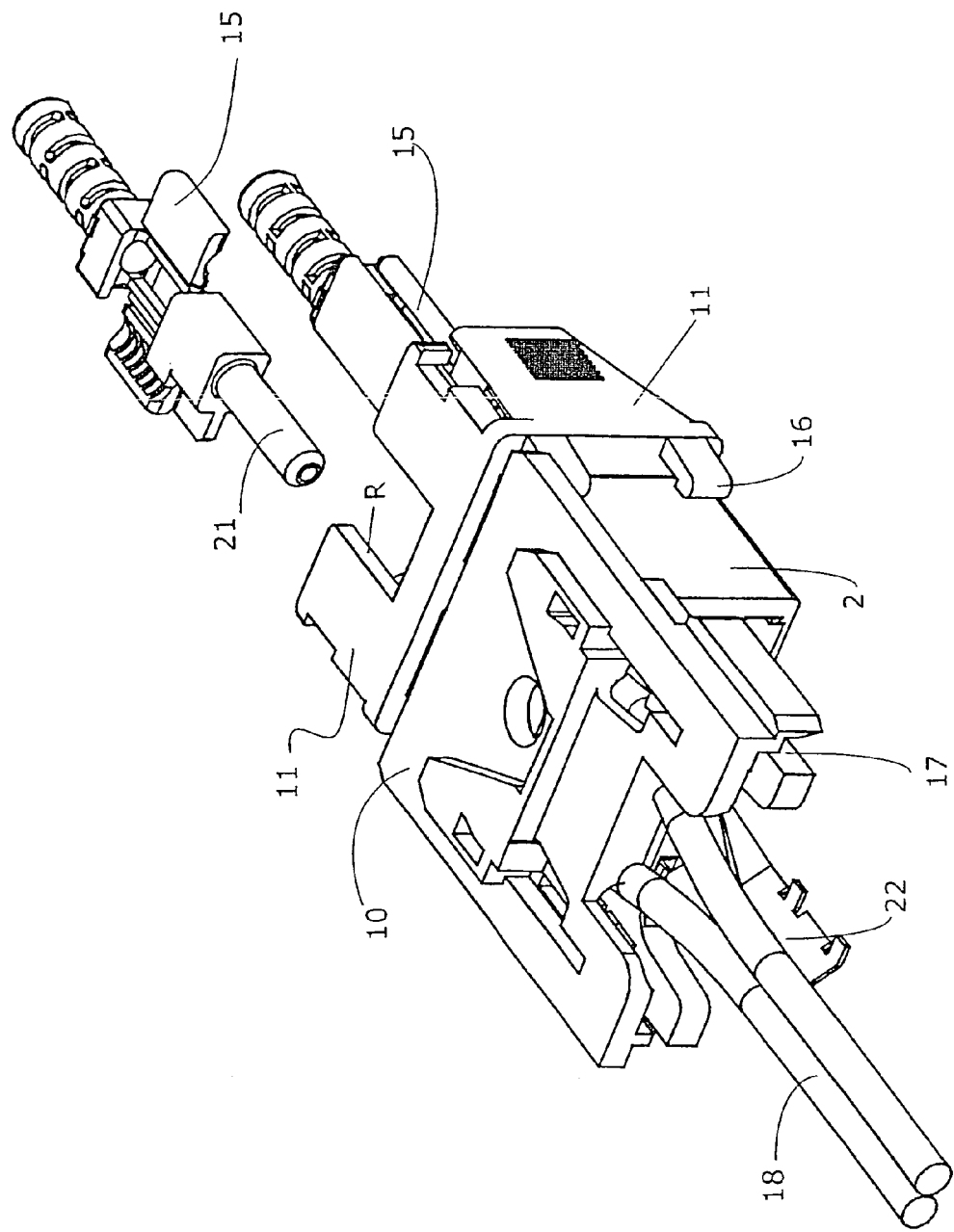
Figure 7:
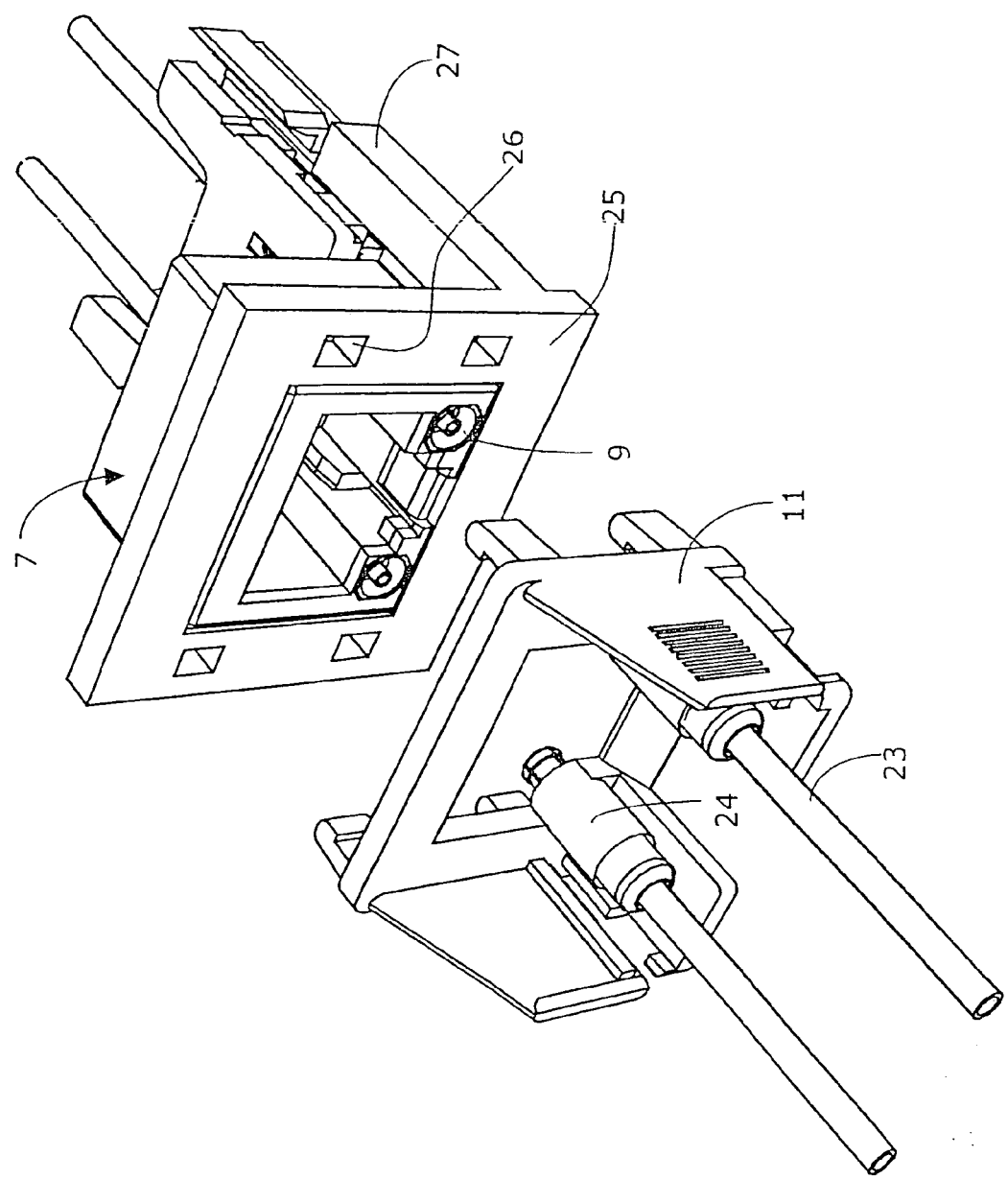
Figure 8:
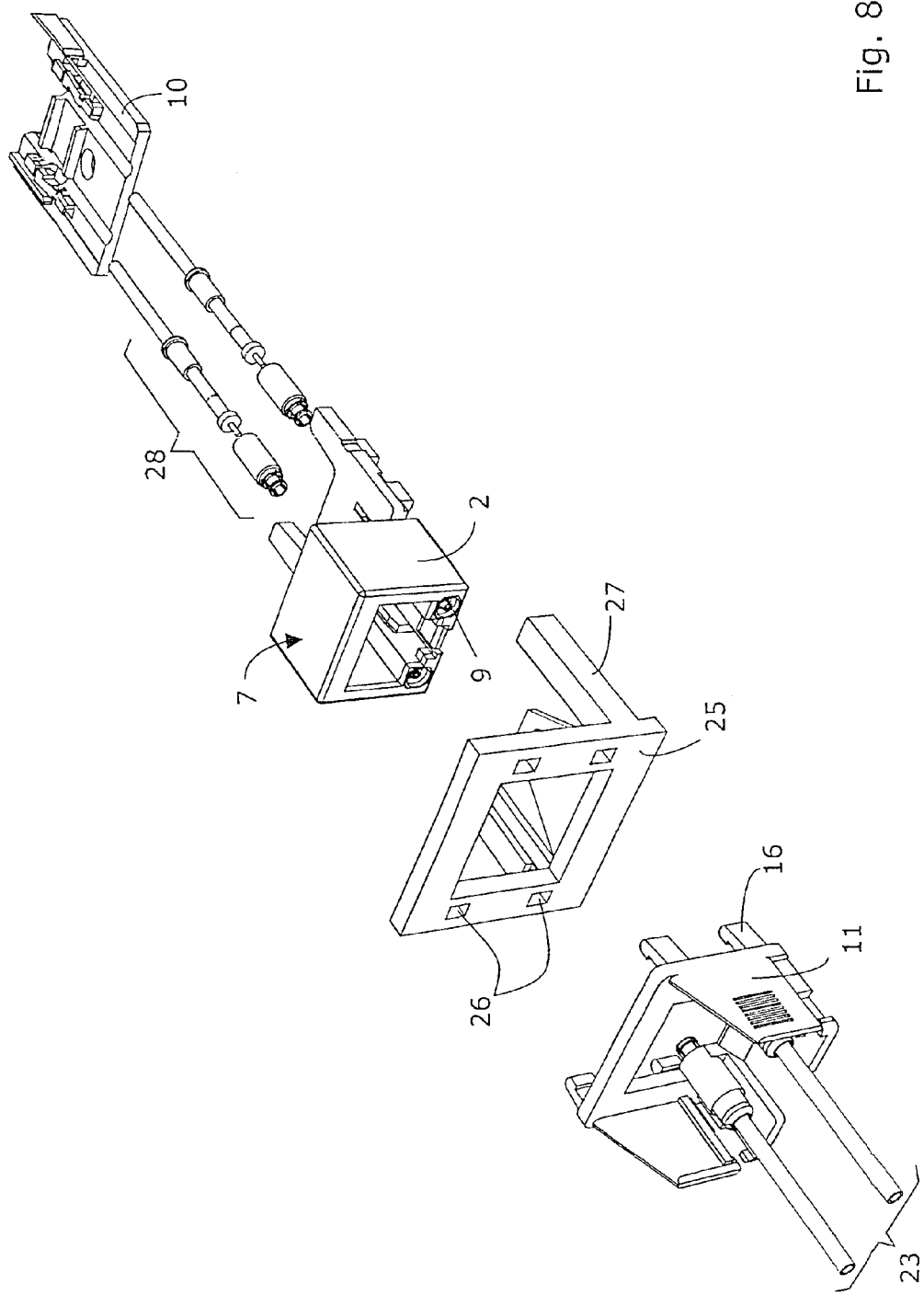
Figure 9:
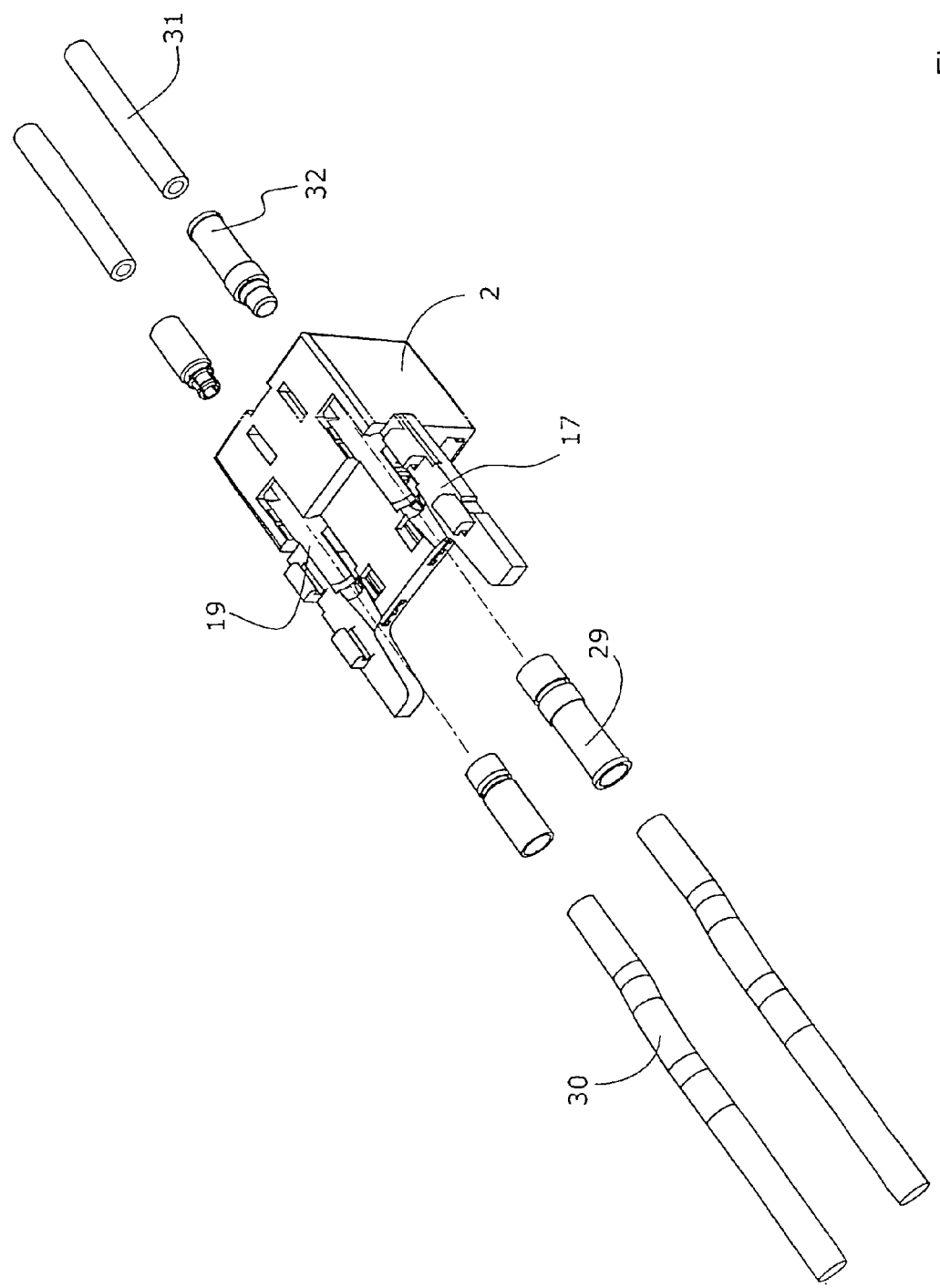
Figure 14:
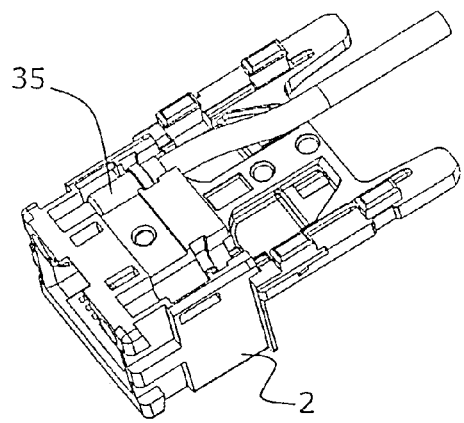
Figure 21:
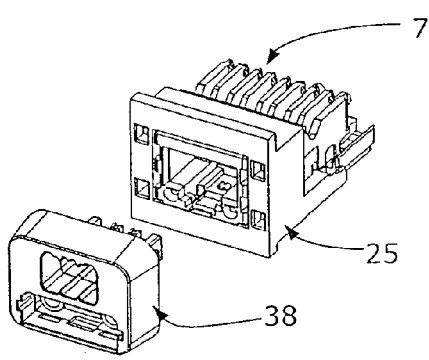
Figure 21:
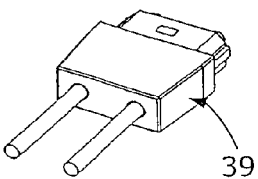
Figure 36:
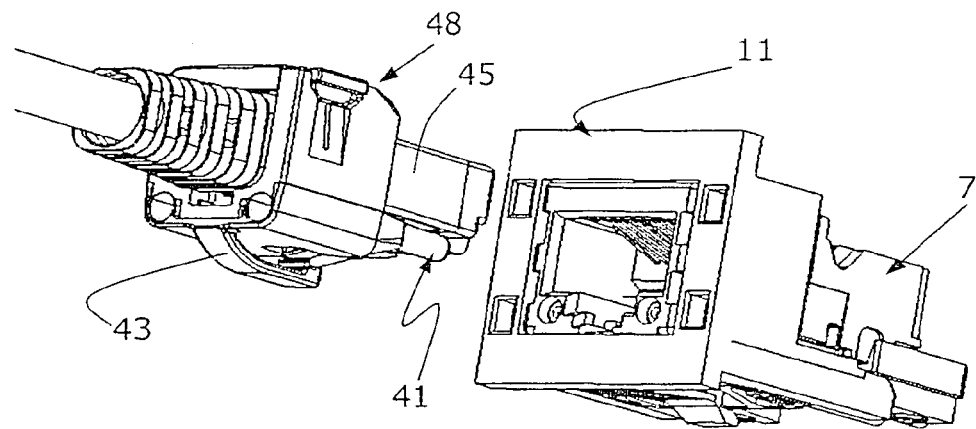

In the following the invention is described in greater detail on the basis of different exemplary embodiments depicted in the figures. Shown are:

| FIG. 1a–1j | various embodiments of internationally standardized SFF sockets for RJ45 plugs |
| --- | --- |
| FIG. 2 | a schematic depiction showing the dimensions of this standardized RJ45 plug, as established by the standard |
| FIG. 3 | a perspective view of the universal interface according to the invention, with a plug holder for an least one additional optical conductor |
| FIG. 4 | a perspective view of an invention interface with a plug holder |
| FIG. 5 | a view of the base of the socket according to the invention |
| FIG. 6 | a view of the base of the invention socket, with plug holder and mounted module-retaining plate |
| FIG. 7 | a view of the plug according to the invention, with electrical conductors |
| FIG. 8 | a breakdown view of the socket according to the invention, with electrical conductors |
| FIG. 9 | a breakdown view from below of an invention socket, with mini-coax cable |
| FIG. 10–20 | the mounting of optical fibers in a socket according to the invention |
| FIG. 21–23 | the use of an adapter frame for positioning a standardized PM-POF plug |
| FIG. 24–30 | assembly and mounting of an auxiliary plug that can be affixed from above |
| FIG. 31–35 | mounting contacts for an auxiliary plug on the socket side |
| FIG. 36, 37 | a universal interface according to the invention |

FIGS. 1a to 1j depict various embodiments of sockets corresponding to international IEC standard 60603-7. These sockets 1 exhibit a housing 2, whose external shape and dimensions conform to the given requirements and areas of application and in particular are limited by IEC standard 60603-7. Thus the housings 2 in FIGS. 1a, 1b, and 1f have contacts on the appliance side which project from the housing in the direction of insertion A. The housings 2 in FIGS. 1c, 1d, and 1e, in contrast, have contacts on the appliance side which project from the housing at right angles to the direction of insertion A. On the plug side these housings 2 are provided with a recess 4 for receiving an RJ44 plug. This recess has a basically rectangular cross-section, the longer side of which is provided with an additional groove for receiving a snap-in strip belonging to the RJ45 plug. This groove forms a snap-in area 6, and results in the formation of steps 5 in the corner area directly next to the snap-in area 6 of the housing 2.

FIG. 2 shows the dimensions of the standardized cross-section of an SFF socket 1 according to IEC standard 60603-7. The given values are compiled in the following table.

TABLE 2

| Designation | Maximum (mm) | Minimum (mm) |
| --- | --- | --- |
| $S_1$ | 12.044 | 11.84 |
| $W_1$ | 6.38 | 6.22 |
| $AC_1$ | 6.96 | 6.76 |
| $AK_1$ | 8.66 | 8.38 |

These data make clear that the housing areas lying next to the snap-in area 6 have a cross-section of at least about 3×3 $mm^2$ and are suitable for receiving additional through-channels.

FIG. 3 shows a hybrid socket 7 according to the invention, with a housing 2 that exhibits a recess 4 on the plug side for receiving a standardized RJ45 plug. In this socket 7 the conductors are led out of the housing 2 on the appliance side in insertion direction A. The corner areas 8 lying immediately next to the snap-in area 6 of the recess 4 exhibit step-shaped housing areas 5, in which through-channels are provided. It is understood that the socket 7 can be built up in modular fashion. Thus FIG. 3 shows a cable guide plate 17 positioned on the appliance side, to which, e.g., means 22 for pull-relief can be attached. With the aid of a module-retaining plate 10 the housing 2 can be secured, e.g., to existing jacks and patch systems. The through-channels 9 have dimensions such that they can interact, e.g., with an optical plug 14.

FIG. 4 shows the same socket as FIG. 3 with a housing 2 suitable for receiving an RJ45 plug. The front of this housing 2 on the plug side is supplemented with a plug holder 11, which exhibits plug guides 12 and plug snap-in holes 13. These plug guides 12 and plug snap-in holes 13 permit an optical conductor to be inserted in controlled fashion and assure the contact between the plug 14 and the socket 7. The plug will advantageously exhibit a plug sealing sleeve 15, which is provided with snap-in projections that interact with the plug snap-in holes 13. The depicted plug holder 11 also exhibits snap-in elements 15 which can engage with holes in a mounting plate, in order to the correctly position and fasten the plug holder 11 to this mounting plate. The plug guides 12 of this plug holder 11 are spaced and dimensioned in such a way that the standards for optical plug systems according to IEEE 1394 are fulfilled.

The view in FIG. 5 is that of the plug housing according to the invention seen from the back. Particularly conspicuous is the design of the cable guide plate 17 applied to the back of the housing 2. In order to secure the appliance-side cable to the housing 2—in the present embodiment a duplex POF conductor 18—grooves 19 running in the direction of the through-channels 9 are applied to the cable guide plate 17. The sensitive POF conductor 18 is guided and protected by these grooves. Clamps will ideally be secured to the contact end of this conductor, the ferrule; the geometry of these clamps is coordinated with the geometry of the back-side outlet of the through-channels 9 to provide a form-fit. By applying a module-retaining plate (not shown) to the top of this cable guide plate 17 the duplex POF conductor 18 can be additionally secured and protected.

FIG. 6 shows the socket 7 according to the invention in assembled state. In this backside view a plug holder 11 is positioned on the plug side of the housing 2. By means of this plug holder 11, the ferrules or optical fibers 21 can be easily introduced, positioned, and protected. It is immaterial whether the optical fibers 21, or their ferrules, have individual plug sealing sleeves 15 or a common plug closure that is standardized according to IEEE 1394. It is understood that the base plate of the plug holder 11 has a recess R, such that the snap-in strip of the RJ45 plug remains accessible from the outside for the purpose of unlocking. This plug holder 11 has snap-in elements 16, which can snap into fastening holes (not shown) in a front plate, in order to correctly position the plug holder 11 and secure it. Resting on the cable guide plate 17 positioned on the housing 2 is a module-retaining plate 10, which both protects the mounted optical fibers 18 and allows the housing 2 to be secured to a predetermined site on the apparatus, in a patch panel, or in an outlet. This arrangement also allows the provision of means 22 for pull relief.

FIG. 7 depicts the socket 7 according to the invention, with the given through-channels 9 for use with feed or coaxial cables 23. This socket 7 basically has the same geometry as the socket shown in FIGS. 3 to 6. The plug holder 11 can be modified to guide the feed cable 23, and/or the feed cable can be equipped with suitably proportioned plug connectors 24. Visible in FIG. 7 is the front plate 25 with the corresponding fastening holes 26 (smart holes). In order to mutually orient the socket 7 and the plug holder 11, the front plate 25 has elongations 27, between which the socket 7 can be fitted.

FIG. 8 shows the same configuration as FIG. 7, with its parts broken down. This view makes clear the modular design of the socket 7 according to the invention. In the mounting process, the appliance-side feed or coax plug 28 is attached to the back of the housing 2. This plug 28, in turn, is composed of various elements in order to permit a correctly positioned connection and to produce a good contact. The module-retaining plate 10 is attached—ideally, snapped on—in order to secure the feed or coax plug 28. The plug housing 2 thus connected to the feed or coax cable can now be attached behind the front plate hole, ideally by utilizing the elongations 27. The plug holder 11 can be fastened to the front plate 25 using the snap-in elements 16 and the fastening holes 26. In this manner the feed or coax cables 23 that have been correctly guided and safeguarded by the plug holder 11 can be correctly inserted into the through-channels 9.

FIG. 9 shows the design of the invention plug housing 2 from below. Here the cable guide plate 17 again exhibits grooves 19, which are provided to receive coaxial sockets 29. Coaxial sockets of this kind are known to the prior art and are connected to the coax cables 30 before mounting. On the plug side the coax cables 31 being attached are likewise connected to known coax-plug connectors (PIN) 32. It is understood that in this embodiment, suitable coupling elements with dielectric material and spring contacts are inserted into the through-channels 9 in order to insure a correct electrical connection.

Figure 15:
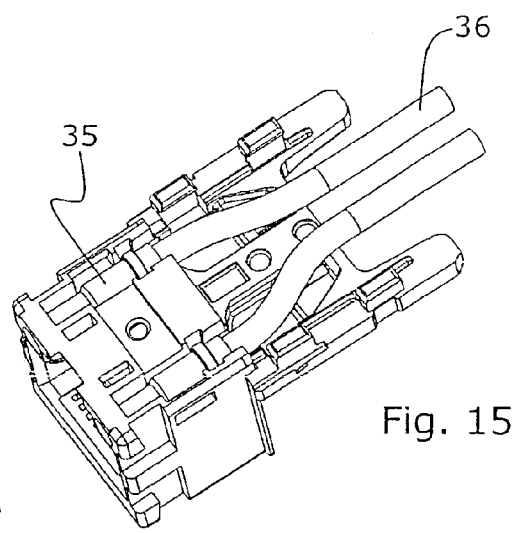
Figure 16:
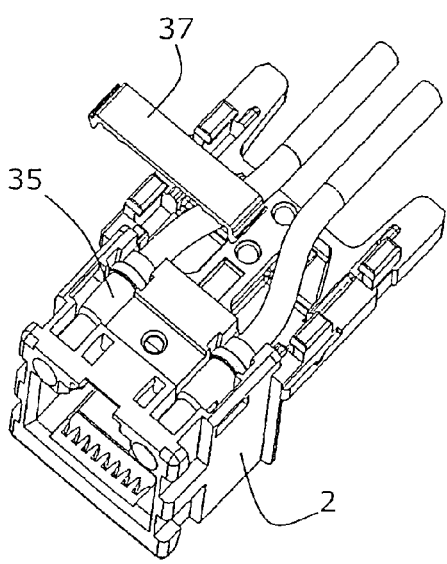
Figure 17:
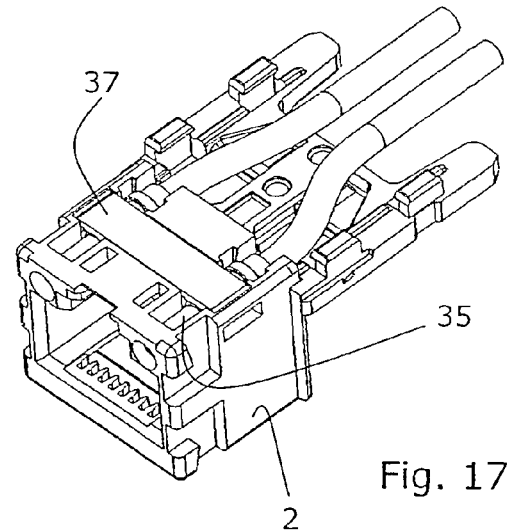
Figure 18:
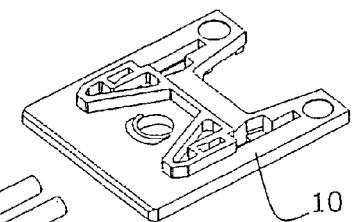
Figure 19:
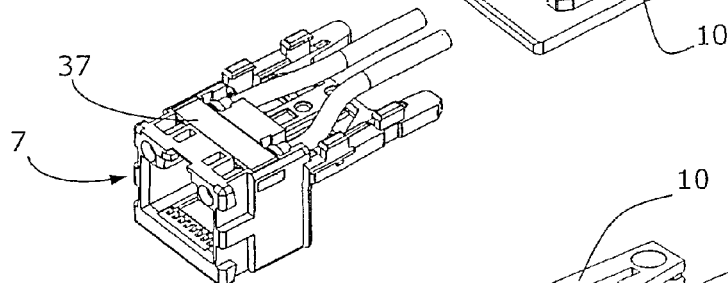
Figure 20:
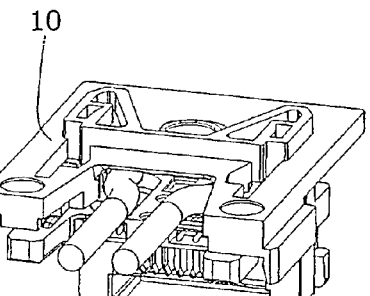

FIG. 10 shows a POF (plastic optical fiber), whose sleeve 34 has been removed in the end area that is to be mounted. As shown in FIG. 11, a ferrule 35 has been pushed over the exposed fiber 33 and fixed in position. The portion of the exposed fiber that projects from the ferrule 35 is ground down flush against the ferrule and is polished, before being inserted into a reception site in the SFF socket designed in accordance with the invention, as shown in FIG. 12. FIG. 13, 14 make clear how the ferrule 35 is swung into the socket housing 2, and depict its exact positioning. As shown in FIG. 15, the second fiber cable 36 is produced and inserted in analogous fashion to the first fiber cable. FIGS. 16 and 17 show a holding clip 37, which assures that the ferrules 35 are safely held in the housing 2. A retaining plate 10 shown in FIGS. 18 to 20 secures this holding clip 37 and also serves to fasten the RJ45 hybrid socket, shown by way of example, in outlets or panels.

FIG. 21 shows an adapter frame 38, which serves to position and hold a standardized PN-POF plug 39 and which can be easily attached to a front plate 25. The adapter frame 38 can be snapped together snugly with the socket 7 by using a wedge-shaped rising latch and can thereby transform the RJ45 hybrid socket according to the invention into a PN coupling, as shown in FIGS. 22, 23. To further use the RJ45 contacts, the upper part of the adapter 38 is designed as a splitter in accordance with U.S. Pat. No. 6,419,527.

Figure 27:
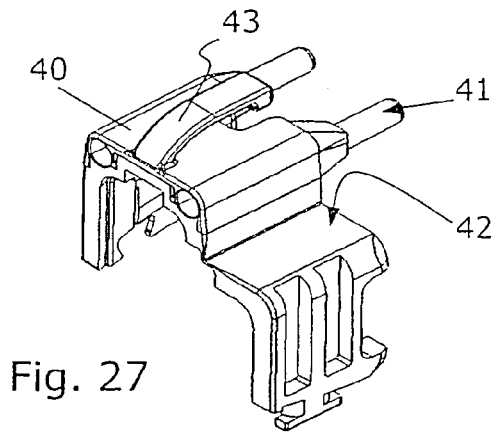
Figure 28:
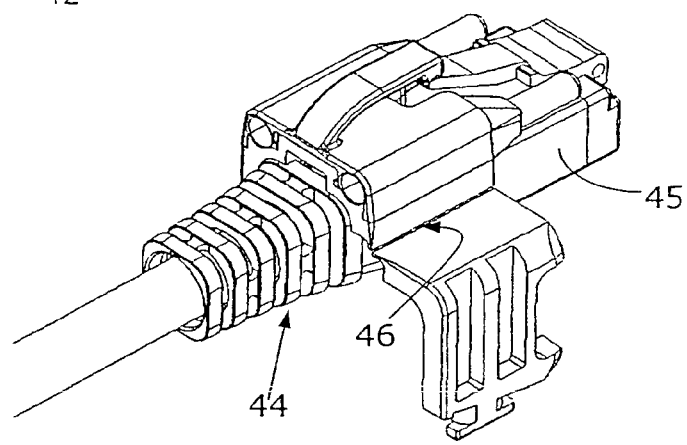
Figure 29:
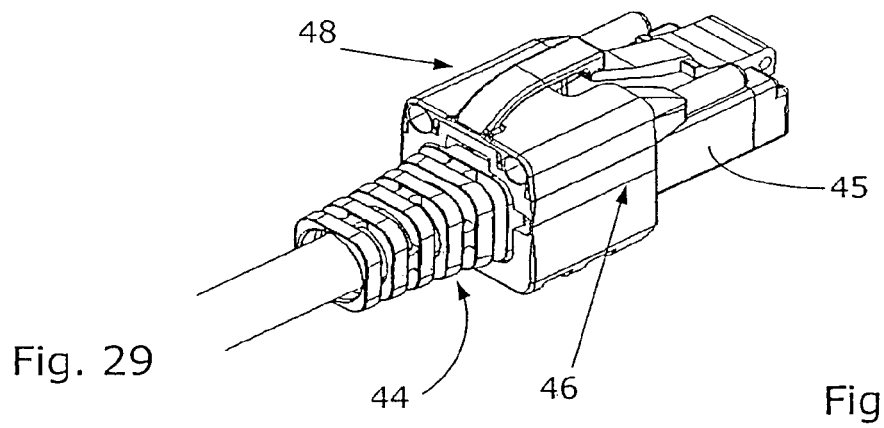
Figure 30:
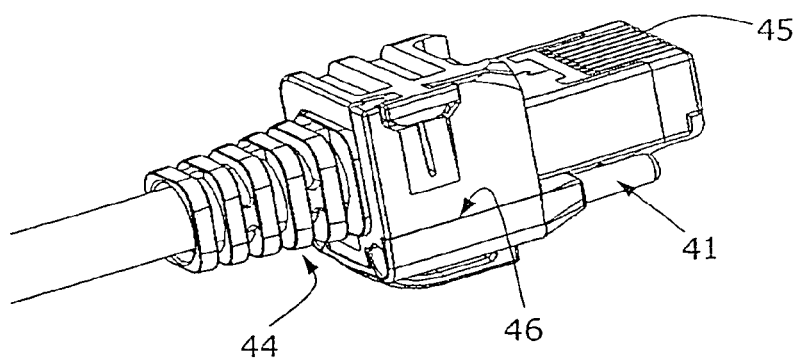
Figure 34:
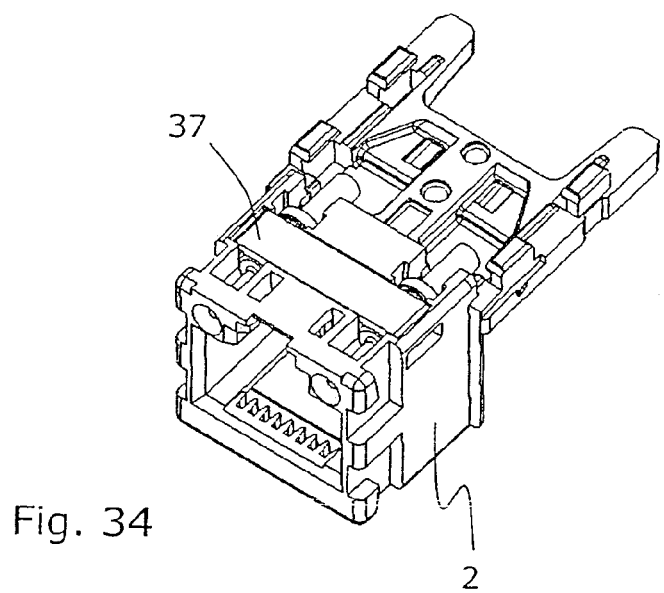
Figure 35:
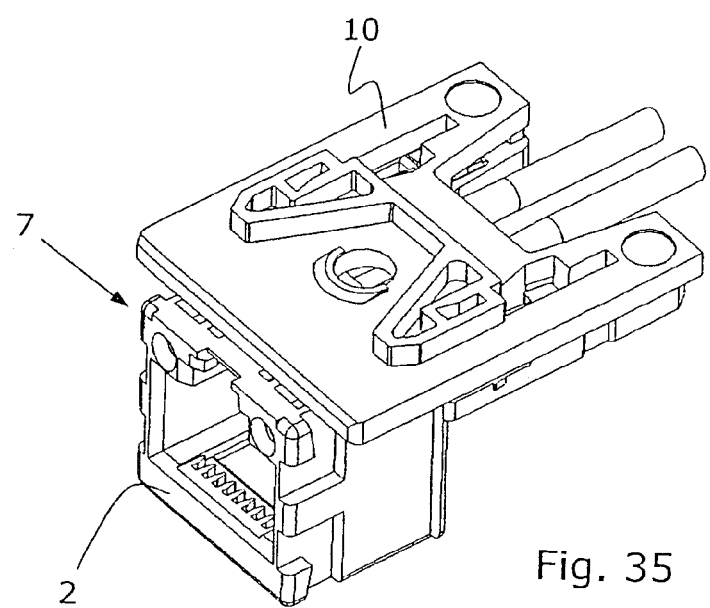

FIGS. 24 and 25 depict a lower housing part 40 belonging to another embodiment of an auxiliary plug that can be combined with a standardized RJ45 plug, the auxiliary plug being so designed as to fit closely onto the anti-buckle device of an RJ45 plug, as described in U.S. Pat. No. 6,520,796. This lower housing part 40 is designed for mounting a pair of electrical contacts, where the socket-side ends of the pair of contacts are provided with suitably dimensioned plug contact sleeves 41 and the cable-side ends of this contact pair have a crimp contact K for connection with a stranded wire cable. FIGS. 26 and 27 show an upper housing part 42, which can be snapped together with the lower housing part 40 to thereby enclose the two contacts. The lower housing part 40 has a latch 43 for locking on an RJ45 plug and serves to provide protection against accidental contact. FIGS. 28 to 30 depict how this auxiliary plug can be fastened to an anti-buckle device 44 of an RJ45 plug and, in particular, how it can be attached in form-fitting manner by means of a film hinge 46.

To receive this electrical plug contact sleeve 41 the hybrid socket 7 according to the invention is outfitted with appropriately dimensioned plug contact parts 47. They are mounted in a fashion analogous to that shown in FIGS. 34 and 35 for the POF ferrules 35.

Figure 37:
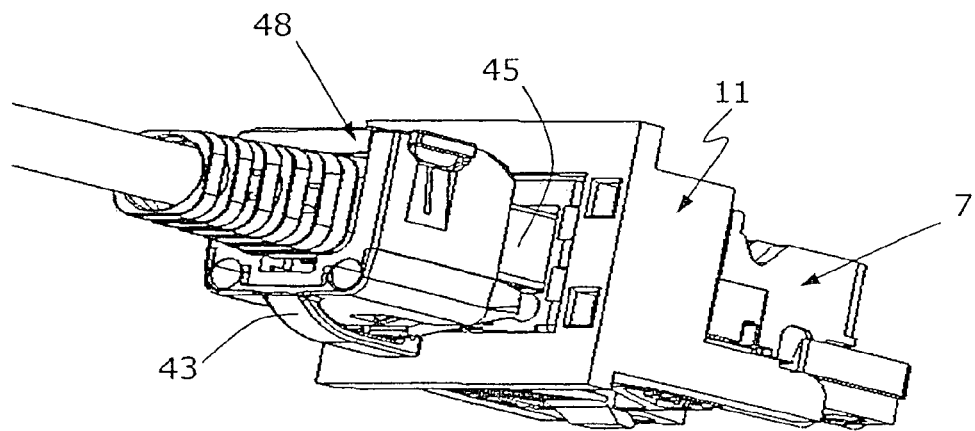

FIGS. 36 and 37 show how the hybrid socket 7 according to the invention can be connected to an RJ45 plug onto which a plug cap (as shown in FIGS. 24-30) is mounted.

The embodiments shown in the figures all exhibit a housing 2 which is suitable for receiving an RJ45 plug, and all are provided with through-channels 9 in the housing area 5 (the area between the recess for receiving the RJ45 plug and the external contours of the SFF sockets), specifically in the area directly next to the snap-in area 6 or, as the case may be, the groove. It is understood that the universal interface built up with an SFF housing of this kind can be furnished with additional modules in order to facilitate the mounting of given conductors, or to guide the latter in controlled fashion, and to protect or fasten them.

The present invention thus makes it possible to combine connections that involve different cable types, without exceeding the cross-section limits imposed by IEC standard 60603-7, and makes it possible to employ the plugs used in these different cable types simultaneously, without loss of the functions proper to those plugs.

The invention claimed is:

1. A hybrid socket (7), with a housing (2) for combining connections involving different cable types which exhibits a recess for a standardized RJ45 plug, and
    at least one step-shaped housing area in at least one corner of said recess, said at least one step-shaped housing area comprising a through-channel,
    wherein said housing (2) for combining connections involving different cable types exhibits means for the simultaneous reception of an electrical and/or optical component in a housing area (5) adjacent to the recess (4).

2. A hybrid socket (7) according to claim 1, wherein the housing (2) is a small form factor housing.

3. A hybrid socket (7) according to claim 1, wherein the means for receiving an electrical and/or optical component are openings and/or through-channels (9) in the housing area (5) lying immediately next to a snap-in area (6).

4. A hybrid socket (7) according to claim 1, wherein the means for receiving an electrical and/or optical component are openings and/or through-channels (9) in a housing area (5) lying opposite to a snap-in area (6).

5. A hybrid socket (7) according to claim 1, wherein the means for receiving an electrical and/or optical component are openings and/or through-channels (9) in a housing area (5) lying to the side of the recess (4).

6. A hybrid plug for use with a hybrid socket (7) according to claim 1.

7. A hybrid plug according to claim 6, wherein said hybrid plug includes an auxiliary plug (48) that can be fitted on top of a standardized RJ45 plug in form-fitting fashion.

8. A hybrid plug according to claim 7, wherein the auxiliary plug (48) exhibits a latch (43) for locking on an RJ45 plug.

9. An auxiliary plug (48) for forming a hybrid plug to be used with a hybrid socket (7) according to claim 1.

10. An adapter frame (38) for use with a hybrid socket (7) according to claim 1.

* * * * *